3,235,525
VINYLIDENE CHLORIDE COPOLYMER LATICES AND PRODUCTS PRODUCED THEREFROM
Dudley G. Woodard, Wilmington, Mass., assignor to W. R. Grace & Co., Cambridge, Mass., a corporation of Connecticut
No Drawing. Filed Sept. 6, 1962, Ser. No. 221,872
8 Claims. (Cl. 260—29.6)

This invention relates to ternary vinylidene chloride copolymer latices and to films deposited therefrom. In one particular aspect, it relates to such latices wherein the polymerized vinylidene chloride is present in major amount and wherein the latex is capable of forming films at room temperatures which are flexible and have high resistance to moisture vapor transmission.

Unmodified polymerized vinylidene chloride is an inferior resin for many purposes because it is weak and brittle. Greatly improved resins can be obtained, however, by copolymerizing vinylidene chloride with various polymerizable organic compounds.

It is generally recognized that vinylidene chloride copolymer films or coatings having maximum moisture vapor barrier characteristics may be obtained by increasing the amount of vinylidene chloride in the copolymer. The property of good resistance to moisture vapor transmission makes the copolymers valuable in the packaging industry where they are used as free films or coatings for more permeable synthetic polymers such as polyethylene.

Conventionally, a vinylidene chloride copolymer is formed by polymerizing the monomers in aqueous emulsion. The dispersed copolymer is then coagulated and dried. Films of the dried copolymer are made by a process of extrusion, supercooling and stretching. One of the inherent disadvantages of this process is that the copolymer must be plasticized to facilitate extrusion. Since it is common for the plasticizer to exude from the films, the acceptability of the films for packaging foods is largely dependent on the character of the plasticizer. Another disadvantage of this process is the difficulty of producing films from copolymers which contain vinylidene chloride in major amounts, i.e., 91 to 95 percent by weight. Such films are most desirable because of their excellent moisture imperviousness. Unfortunately, the high fusion temperatures of these copolymers and their almost complete incompatibility with plasticizers result in films which are brittle and of relatively very limited utility.

Ordinarily, vinylidene chloride copolymer latices that have a high vinylidene chloride content are not capable of depositing films which, when air dried at room temperature, are flexible and continuous. Increasing the amount of vinylidene chloride in the copolymer latex is not readily accomplished because other necessary properties relating to film formation, flexibility and toughness cannot be obtained. There are some three-component copolymer latex systems containing vinylidene chloride in an amount as high as 90 percent which do form films that are flexible and have good moisture imperviousness, but the monomer ratio of these systems is very specific. Variations of as little as ±3 percent result in latices which do not form flexible films at room temperature and in most cases up to 150° C. where thermal decomposition renders the film unusable. The extremely confining nature of such a system makes it impossible to achieve certain desirable properties without sacrificing others. For example, an increase in barrier properties suggests a higher percentage of vinylidene chloride. This is not possible without introducing film brittleness and indeed complete loss of film consolidation at above 92 percent vinylidene chloride.

It is an object of the present invention to provide vinylidene chloride copolymer latices which overcome the aforementioned disadvantages. The latices of the instant invention are obtained by the emulsion polymerization of three monomeric components comprised of a predominant amount of vinylidene chloride and minor amounts of a 2-cyano (lower alkyl) acrylate and an alkyl acrylate or an alkyl itaconate. Monomer ratios of the three components are provided within such limits that the resulting copolymers form films at room temperatures that are flexible and continuous. Since the films generally contain no external plasticizer which might exude, they can be used safely to wrap foods.

Generally, the 2-cyano (lower alkyl) acrylates wherein the alkyl group contains from 2 to 4 carbon atoms are satisfactory. 2-cyanoethylacrylate is preferred.

Satisfactory films are deposited from latices comprised of about 80 to 97 percent by weight of vinylidene chloride, about 0.33 to 15 percent by weight of 2-cyano (lower alkyl) acrylate and about 1 to 6.66 percent by weight of an alkyl ester of acrylic or itaconic acid. The preferred films, i.e., those with a high content of polymerized vinylidene chloride which are also flexible and strong, are deposited from latices comprised of 92 to 95 percent by weight of vinylidene chloride, 0.33 to 4 percent by weight of 2-cyanoethylacrylate and 1 to 6.66 percent by weight of an alkyl ester of acrylic or itaconic acid.

Any of the alkyl esters of acrylic or itaconic acid may be employed in the monomeric mixture. Among these are methyl, ethyl, propyl, butyl, amyl, hexyl, heptyl, octyl, nonyl, isononyl, decyl, and even higher alkyl acrylates and itaconates. Generally, films with more desirable properties, such as good slip characteristics, are formed with the lower alkyl acrylates and itaconates in which the alkyl group contains from 1 to 4 carbon atoms. Particularly satisfactory films are obtained with ethyl or butyl acrylate.

Briefly stated, the ternary polymer latices are produced by polymerizing 80 to 97 percent by weight vinylidene chloride, 0.33 to 15 percent by weight 2-cyano (lower alkyl) acrylate and 1 to 6.66 percent by weight of an alkyl ester of acrylic or itaconic acid in aqueous emulsion, in the presence of a polymerization catalyst, at a temperature between 20 and 80° C., and at a pH between 1.5 and 4.5. The operative ratios of monomers (dispersed phase) to water (continuous phase) to produce film-forming latices, are from 20 to 72 percent monomers and correspondingly from 80 to 28 percent water. The polymerization is generally continued until 70 to 99.9 percent preferably 99 percent of the total monomers are converted to terpolymer.

Any emulsifier capable of operating in an acid medium may be used. For example, the soluble salts of an aryl sulfonic acid or of a long chain alkyl sulfate such as sodium dodecyl benzene sulfonate and sodium lauryl sulfate are satisfactory. The emulsifier is generally employed in an amount of about 1 to 10 percent of the weight of the water-immiscible materials present.

Any of the conventional peroxides, persulfates or azo compounds can be utilized as catalysts. Among the suitable catalysts may be mentioned potassium persulfate, sodium persulfate, hydrogen peroxide, peracetic acid, benzoyl peroxide, azo-bis-isobutyronitrile, cumene hydroperoxide, tertiary butyl perbenzoate, redox catalyst such as a combination of any of the peroxygen catalysts mentioned above together with reducing agents such as sodium sulfite, sucrose, ferrous gluconate, etc. The amount of the catalyst is generally not critical and may be from about 0.1 percent to above 5 percent by weight of the materials to be polymerized.

The desired pH may be obtained by introducing small amounts of acids to the emulsion and may be maintained by means of buffering agents.

Film formation of the latex of the instant invention will take place by depositing a coating of the latex on any suitable substrate and drying it in air for about two minutes at room temperature. Free films may be obtained by depositing the latex on a non-porous surface of a substrate and stripping the dried film from the substrate. If a shorter drying cycle is required, temperatures as high as about 105° C. may be used. It has been found, however, that if excessive drying temperatures are employed, film discoloration may occur and in some cases, blistering of the film has been observed.

The method or means of depositing a coating of the latex on any suitable substrate is not critical. Any type of mechanism or device which is capable of depositing a uniform amount in the desired thickness to the substrate may be employed. Special types which may be used include air knife coater, horizontal and vertical size presses, trailing blade, transfer roll, reverse roll, roller coater, gravure, bead coat, metering bar, spray coater, and curtain coater. Deposition may be carried out in one or a number of applications.

Some coating methods may require an increase in the viscosity of the latex. In such case, the viscosity change may be brought about without interfering with film-forming properties by the addition of suitable thickening agents, such as sodium alginate, karaya gum, hydroxyethyl cellulose and polyvinyl alcohol. Ordinarily, satisfactory results are obtained with less than 1 percent of the thickening agent based on the weight of the dispersed solids. As little as 0.02 percent of these agents increases the latex viscosity from a normal viscosity of about 5 to 30 centipoises to values about 100 centipoises.

While the new ternary polymers are capable of forming continuous films or coatings without any external plasticizer being present, plasticizers may be added for specified uses.

It is to be understood that the present invention is not limited to the deposition of films and coatings from the copolymer latices. If desired, the copolymer latices of the instant invention may be coagulated by the addition of any conventional coagulant. The coagulum may then be dried, dissolved in a suitable solvent, and the solution used to deposit films and coatings.

The following examples further illustrate the invention. Proportions used here and elsewhere herein refer to parts by weight.

*Example 1*

Two latices were prepared under uniform conditions, each of which was 2-cyano(ethyl)acrylate and butyl acrylate, in the proportions reflected in Table I.

70 parts by weight of the monomer mixture were added to 30 parts by weight of water, to which had been added 0.2 parts by weight hydrogen peroxide (catalyst) and 4 parts by weight dodecyl benzene sodium sulfonate as emulsifier. The mixture was shaken until emulsified and was kept at a constant temperature of 50° C. until polymerization was about 99 percent complete.

In addition, two latices were similarly prepared, each of which was comprised of vinylidene chloride and butyl acrylate only, wherein the amount of vinylidene chloride was the same as that in the ternary polymer latices.

Moisture vapor transmission values of films of each of the latices were determined by coating the latex on a surface of bleached kraft paper. For this test, the coated paper samples were dried in air at 60° C. and aged for 1 day. Each coating was 0.3 mil thick. The results are tabulated in Table I.

TABLE I

| Monomer Composition Percent | | | M.V.T. (grams $H_2O$/ 100 sq. in./24 hours at 90% RH and 100° F.) | Characteristics of Coating on Kraft Paper |
|---|---|---|---|---|
| Vinylidene Chloride | Butyl Acrylate | 2-Cyanoethyl Acrylate | | |
| 85 | 13.66 | 1.33 | 0.327 | Flexible, continuous coating. |
| 92 | 6.66 | 1.33 | 0.126 | Do. |
| 92 | 8 | 0 | 7.03 | Brittle, continuous coating. |
| Kraft Paper Control | | | 50 + (saturated) | |

As noted from the above table, an increase of vinylidene chloride in the ternary polymer latices of the instant invention results in a considerable drop in moisture vapor transmission without affecting film characteristics. In the two component system, however, an increase of vinylidene chloride results in a brittle film with poor resistance to moisture vapor transmission.

*Example 2*

Latices were prepared of ternary polymers comprised of various proportions of vinylidene chloride, 2-cyanoethylacrylate and various alkyl esters of itaconic and acrylic acid in a manner similar to that described in Example 1.

Each of the latices were coated on a surface of strips of glassine, a thin, transparent, highly flexible paper. The coated strips were dried in air at room temperature and the final thickness of the dried coating ranged from 0.3 to 0.7 mil.

All of the dried coatings were continuous. A number of the coated strips differed, however, in clarity, flexibility and toughness. These properties were determined and ranged from excellent to poor. The results are tabulated in Table II. The clarity of a coating which was clear and glossy was rated as excellent. A very slightly hazy coating was considered good while one with an appreciable amount of haze was rated as fair. A nearly opaque coating was considered poor.

Flexibility was measured by folding the coated glassine strips at an angle of 180° and noting the pliability and recovery of the coating. A highly pliable coated strip wherein the coating showed full recovery after creasing was rated as excellent. A slightly less pliable strip wherein the coating showed slightly less than full recovery was rated as good, while one wherein the coating was slightly brittle and showed poor recovery after creasing was considered fair. If the coating was very brittle and cracked when the strip was folded at 180°, it was rated as poor.

Toughness was measured by flexing the coated strip and by pulling at both ends of the strip simultaneously. The toughness of a coating which was observed as highly consolidated, strong and firm in texture, yet flexible and not brittle was rated as excellent. A coating slightly less firm and slightly less compact in texture was considered good, whereas one which was appreciably limp and slightly flimsy was rated as fair. A coating which was flimsy, weak and brittle was considered poor.

TABLE II

| Vinylidene Chloride, percent by weight | 2-cyano ethyl acrylate percent, by weight | Percent by weight | Ester | Characteristic of Coating on Glassine Strips | | |
|---|---|---|---|---|---|---|
| | | | | Clarity | Flexibility | Toughness |
| 80 | 15 | 5 | Butyl acrylate | Excellent | Excellent | Excellent. |
| 92 | 2 | 6 | Di-n-butyl itaconate | Fair | Good | Fair. |
| 92 | 1.33 | 6.66 | Methyl acrylate | ----do | ----do | Good. |
| 92 | 1.33 | 6.66 | Butyl acrylate | ----do | ----do | Do. |
| 92 | 1.33 | 6.66 | Butyl methacrylate | ----do | ----do | Fair. |
| 92 | 1.33 | 6.66 | Ethyl acrylate | ----do | Excellent | Fair-good. |
| 92 | 1.33 | 6.66 | 2-ethyl hexyl acrylate | Good | Good | Fair-poor. |
| 93 | 1.33 | 5.66 | Ethyl acrylate | ----do | ----do | Fair. |
| 93 | 0.33 | 6.66 | ----do | Fair-good | ----do | Do. |
| 94 | 1.33 | 4.66 | ----do | Good | Fair-good | Do. |
| 95 | 4 | 1 | ----do | ----do | Good | Good. |
| 95 | 4 | 1 | Di-n-butyl itaconate | ----do | ----do | Do. |
| 97 | 2 | 1 | Butyl acrylate | ----do | Fair | Do. |

Table II illustrates that effective films are obtained from the ternary copolymer latices of the instant invention, wherein polymerized vinylidene chloride is present in proportions ranging from 80–97 percent by weight.

*Example 3*

Some of the latices prepared in Example 2 were coated on a surface of strips of cellophane and dried in air at room temperature. All of the dried coatings were continuous and ranged in thickness from 0.3 to 0.7 mil. Clarity and flexibility of the coatings were determined as described in Example 2. The results are tabulated in Table III.

Free films of the above latices coated on cellophane were also prepared. The latices were coated on cellophane, dried in air at room temperatures and the dried films were stripped from the cellophane. The flexibility of the films was determined in a manner similar to that described in Example 2 and the results are tabulated in Table III.

TABLE III

| Vinylidene Chloride, Percent by weight | 2-Cyano Ethyl Acrylate, Percent by weight | Percent by weight | Ester | Characteristics of Coating on Cellophane | | Characteristics of Free Film | |
|---|---|---|---|---|---|---|---|
| | | | | Clarity | Flexibility | Flexibility | Flexibility after aging 30 days |
| 92 | 4 | 4 | Di-n-butyl itaconate | Excellent | Good | Good | Poor. |
| 92 | 1.33 | 6.66 | Methyl acrylate | Good | ----do | ----do | Fair-Good. |
| 92 | 1.33 | 6.66 | Butyl acrylate | ----do | ----do | ----do | Good. |
| 92 | 1.33 | 6.66 | Butyl methacrylate | ----do | ----do | ----do | Do. |
| 92 | 2 | 6 | Di-n-butyl itaconate | ----do | ----do | ----do | Do. |
| 92 | 1.33 | 6.66 | Ethyl acrylate | ----do | ----do | ----do | Do. |
| 92 | 1.33 | 6.66 | 2-Ethyl hexyl acrylate | ----do | Fair-Poor | ----do | Do. |
| 93 | 1.33 | 5.66 | Ethyl acrylate | ----do | Good | ----do | Do. |
| 93 | 0.33 | 6.66 | ----do | ----do | ----do | ----do | Fair. |
| 94 | 1.33 | 4.66 | ----do | ----do | ----do | ----do | Poor. |

*Example 4*

A latex of a ternary polymer comprised of 92 percent vinylidene chloride, 1.33 percent 2-cyanoethylacrylate and 6.66 percent butyl acrylate was prepared in a manner similar to that described in Example 1. The latex contained about 60 percent solids.

200 grams of the latex along with 400 grams of a 1 percent aqueous aluminum sulfate solution were added to 400 grams of a 1 percent aqueous aluminum sulfate solution with stirring to coagulate the copolymer, the coagulum was recovered and substantially dried in air. 25 grams of the dried coagulum were dissolved in 75 grams of tetrahydrofuran. The solution was spread on glass and dried in air at room temperature.

The so-formed film was stripped from the glass and was found to be flexible and continuous.

I claim:

1. An aqueous emulsion of a ternary polymer obtained by polymerizing together a monomer mixture in the presence of an emulsifier and a polymerization catalyst at a pH between 1.5 and 4.5, said monomer mixture being comprised of from 80 to 97 percent by weight of vinylidene chloride, from 0.33 to 15 percent by weight of 2-cyano (lower alkyl) acrylate wherein the alkyl group contains from 2 to 4 carbon atoms, and from 1 to 6.66 percent by weight of an alkyl ester selected from the group consisting of an alkyl acrylate and an alkyl itaconate, said monomer mixture being dispersed in water in a ratio of from 20 to 72 percent by weight of the total monomer mixture and correspondingly from 80 to 28 percent by weight of water until polymerization is substantially complete.

2. An aqueous emulsion of a ternary polymer according to claim 1 wherein the 2-cyano (lower alkyl) acrylate is 2-cyanoethylacrylate.

3. An aqueous emulsion of a ternary polymer according to claim 2 wherein the mixture is comprised of from 92 to 95 percent by weight of vinylidene chloride, from 0.33 to 4 percent by weight of 2-cyanoethylacrylate, and from 1 to 6.66 percent by weight of an alkyl ester selected from the group consisting of an alkyl acrylate and an alkyl itaconate.

4. An aqueous emulsion of a ternary polymer obtained by polymerizing together a monomer mixture in the presence of an emulsifier and a polymerization catalyst, at a pH between 1.5 and 4.5, said monomer mixture being comprised of 92 percent by weight of vinylidene chloride, 1.33 percent by weight of 2-cyanoethylacrylate and 6.66 percent by weight of butyl acrylate, said monomer mixture being dispersed in water in a ratio of from 20 to 72 percent by weight of the total monomer mixture and correspondingly from 80 to 28 percent by weight of water until polymerization is substantially complete.

5. A film deposited from the emulsion of claim 1.

6. A film-forming organic solution of a polymer comprised of from 80 to 97 percent by weight of vinylidene chloride, from 0.33 to 15 percent by weight of 2-cyano (lower alkyl) acrylate wherein the alkyl group contains from 2 to 4 carbon atoms, and from 1 to 6.66 percent by weight of an alkyl ester selected from the group consisting of an alkyl acrylate and an alkyl itaconate.

7. A film-forming solution of a polymer comprised of 92 percent by weight of vinylidene chloride, 1.33 percent by weight of 2-cyanoethylacrylate and 6.66 percent by weight of butyl acrylate dissolved in tetrahydrofuran.

8. A film deposited from the solution of claim 6.

References Cited by the Examiner
UNITED STATES PATENTS 2,538,737 1/1951 Stanton et al. _____ 260—29.6
3,094,551 6/1963 Sauers et al. _____ 260—86.1

MURRAY TILLMAN, *Primary Examiner.*